(No Model.)
D. D. BRIGGS, Jr.
Seed Planter.
No. 231,264. Patented Aug. 17, 1880.
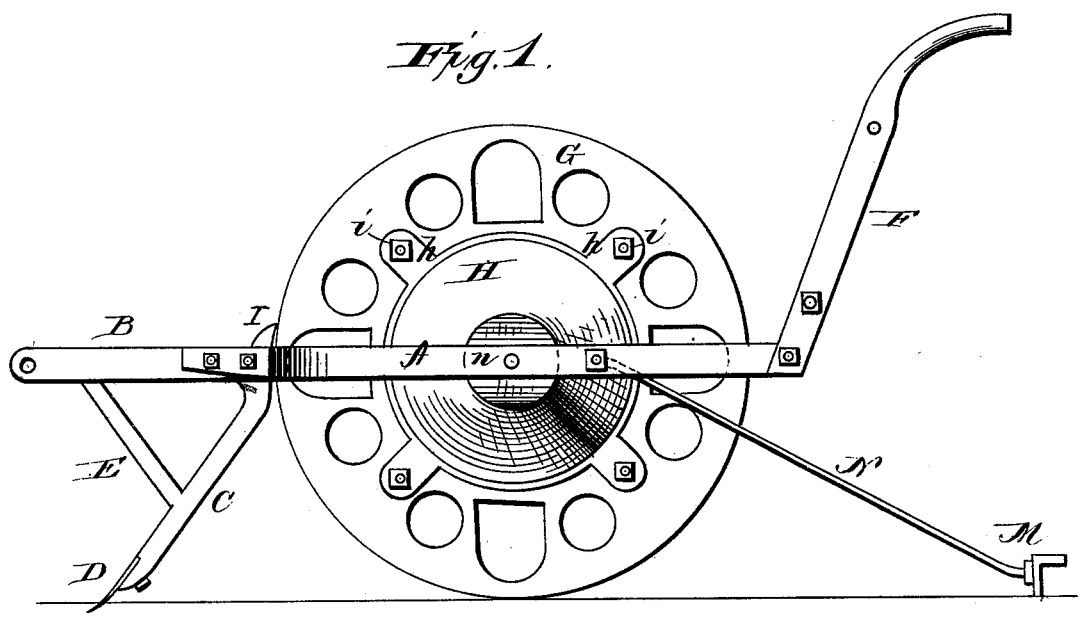
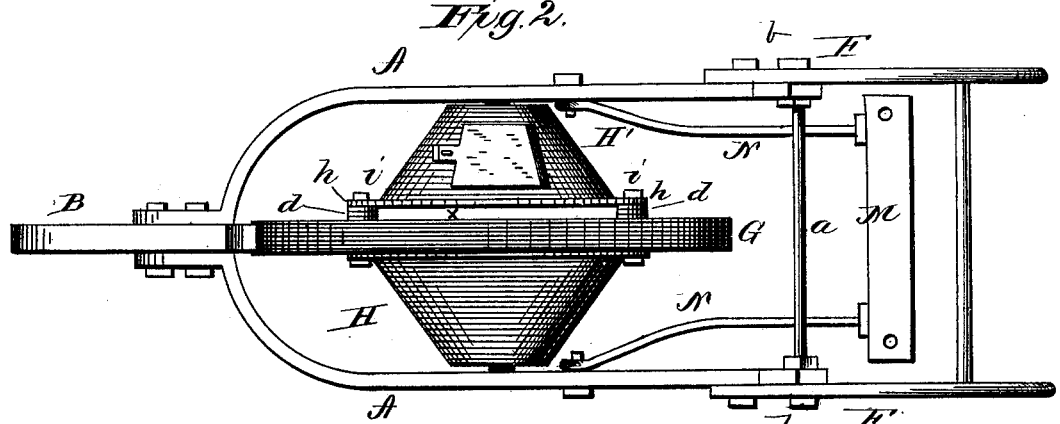
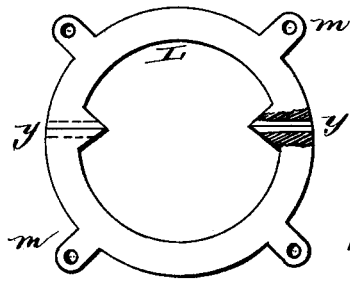
Witnesses.
P. L. Ourand.
J. J. McCarthy.
Inventor.
D. D. Briggs
By Alexander Thurston
Atty.

UNITED STATES PATENT OFFICE.

DUNCAN D. BRIGGS, JR., OF MERIDIAN, MISSISSIPPI.

SEED-PLANTER.

SPECIFICATION forming part of Letters Patent No. 231,264, dated August 17, 1880.

Application filed June 22, 1880. (No model.)

*To all whom it may concern:*

Be it known that I, DUNCAN D. BRIGGS, Jr., of Meridian, in the county of Lauderdale, and in the State of Mississippi, have invented certain new and useful Improvements in Seed-Planters; and I do hereby declare that the following is a full, clear, and exact description thereof, reference being had to the accompanying drawings, and to the letters of reference marked thereon, making a part of this specification.

The nature of my invention consists in the construction and arrangement of a cotton and corn planter, as will be hereinafter more fully set forth.

In order to enable others skilled in the art to which my invention appertains to make and use the same, I will now proceed to describe its construction and operation, referring to the annexed drawings, in which—

Figure 1 is a side elevation, and Fig. 2 a plan view, of my machine arranged as a seed-planter. Fig. 3 shows the device for converting the machine into a corn-planter.

The frame of the planter is composed of two parallel side bars, A A, the front ends of which are curved inward and fastened to opposite sides of the tongue B, and between the forward ends of the side bars, at the rear end of the tongue, is fastened the plow-standard C, carrying the plow D, and braced to the tongue by the brace E. The rear ends of the side bars, A A, are turned upward at an angle, and to these turned-up portions are secured the handles F F, and a rod, $a$, passed through, as shown, having nuts $b\ b$ on each end, whereby the frame is braced and strengthened.

G represents a wheel, having on opposite sides conical hoppers H H' attached to it. The hopper H lies close to the side of the wheel, while the other hopper, H', is separated from it by means of washers $d\ d$. Both hoppers are provided with radial arms or projections $h$, through which bolts $i$ are passed to fasten them to the wheel. The washers $d$ cause a seed-opening, $x$, to be left all around, through which the seed falls into the furrow made by the plow D. By changing the washers this opening $x$ may be made wider or narrower, as desired.

The upper end of the plow-foot C is extended upward to form a scraper, I, for keeping the circumference of the wheel G clean and free from dirt.

To convert the seed-planter into a corn-planter I use an annular ring, L, made in two parts, and provided with radial arms or projections $m$, to be fastened by the same bolts $i$ between the wheel G and hopper H'. At the ends of the two parts of the ring L are inward projections, and the ends are grooved, so that when placed together and in position passages $y$ will be formed, through which the corn will pass out.

M represents a coverer connected to the side bars, A A, by pivoted rods or arms N N, and provided with suitable receptacles for the application of weights.

In the ends of the hoppers H H' are journals $n\ n$, which have their bearings in the side bars, A A.

Having thus fully described my invention, what I claim as new, and desire to secure by Letters Patent, is—

In a corn and seed planter, the wheel G, the conical hopper H H', the former portion bolted closely to the wheel G, and the latter secured by the same bolts to the said wheel, to form adjustable opening $x$, by means of washers $d$ and nuts $i$, and the interchangeable sectional corn-dropping attachment composed of the rings L, having perforated arms $m$ and planting-slot $y$, all constructed and combined to operate as described, for the purpose set forth.

In testimony that I claim the foregoing I have hereunto set my hand this 11th day of June, 1880.

DUNCAN D. BRIGGS, JR.

Witnesses:
J. H. CROOKS,
G. H. BALL.